United States Patent Office 2,857,307
Patented Oct. 21, 1958

2,857,307
FUNGICIDES AND METHODS OF PREPARING THE SAME

Jan Hendrik Uhlenbroek, Weesp, Netherlands, assignor, by mesne assignments, to North American Philips Company, Inc., New York, N. Y., a corporation of Delaware No Drawing. Application August 26, 1955
Serial No. 530,892

Claims priority, application Netherlands August 27, 1954

10 Claims. (Cl. 167—30)

It is known that certain compounds of the atomic configuration of $SO_2.S.CCl_3$ have fungicidal properties. Examples of such substances are trichloromethylbenzene-thiolsulphonate and trichlormethylparatoluene-thiolsulphonate which correspond to the following structural formulae respectively—

I

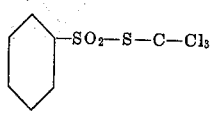

and

II

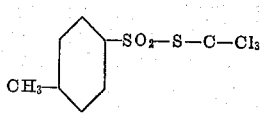

The research leading to the present invention has proved that the aforesaid compounds I and II have a disadvantage in practical use as fungicidies in that they have a great phytotoxicity, which becomes especially manifest in damage to leaves or in delay in germination.

It was found that substances having fungicidal properties are obtained without any substantial phytotoxic effects, if one of the hydrogen atoms of the benzene nucleus is replaced by a carboxylic acid group or a functional derivative thereof, for example an ester or a salt. Accordingly the invention relates to a method of producing a compound having fungicidal properties and causing no serious damage to leaves of the vegetation to be protected from fungi and is characterized in that the compounds of the general formula of

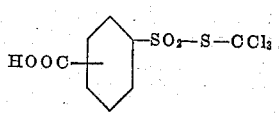

are produced or esters or salts thereof, in which the carboxylic acid group can occupy the ortho-, meta- or para-position relative to the thiolsulphonate group.

Although, in principle, the various ortho-, meta- and para-isomers of the aforesaid compounds have a similar effect, the para-compound has been found to be most suitable for practical uses.

The esters may, for example, be alkyl-esters, for example methyl- or ethyl-esters. Both organic and inorganic salts have the said effect: use may, for example, be made of the alkali metal or alkaline earth salts or the salts obtained by the reaction of the corresponding acid with organic bases, for example morpholine or triethanolamine.

In accordance with the method of invention a mono-carboxybenzene sulphinic acid or a salt thereof, in which the carboxylic acid group may be esterified or converted into a salt, is coupled with perchloromethylmercaptane. If desired, the carboxylic acid group is then converted into a salt, an acid or an ester.

The method according to the invention is preferably performed in an aqueous medium. The compound to be obtained is precipitated and can be readily isolated.

EXAMPLE 1 p-Carboxybenzene-sulphinic acid 110 grs. (0.5 mol.) of p-carboxybenzene-sulphochloride was added while stirring to a solution of 252 grs. (1 mol.) of crystallized sodium sulphite ($Na_2SO_3.7H_2O$) in 750 ccs. of water. While stirring, a 50% aqueous solution of sodium hydroxide was then added at a rate such that the pH of the reaction mixture remained weakly alkaline. To this end a total quantity of 85 ccs. of lye was required. During the reaction the temperature was kept at 40° C. Then the reaction mixture was stirred for one hour and then acidified, while cooling, by means of a mixture of 185 grs. of concentrated sulphuric acid and 110 ccms. of water. The precipitation obtained was sucked off and washed a few times with water.

Trichloromethyl-p-carboxybenzene-thiolsulphonate

The p-carboxybenzene-sulphinic acid obtained by the method referred to in Example 1 was suspended in 500 ccs. of water. To this mixture a 50% aqueous solution of sodium hydroxide was added with cooling and stirring until the liquid was just weak alkaline. After filtering off undissolved solids, the aqueous solution of the disodium salt of p-carboxybenzene-sulphinic acid was diluted with 2.5 litres of water; to this solution was added a quantity of 2 N. hydrochloride acid, which was equivalent to half the quantity of the aforesaid 50% aqueous sodium hydroxide solution. While stirring vigorously 93 grs. of perchloromethylmercaptane (½ mol) was slowly added to the solution thus obtained during which addition the trichloromethylcarboxybenzenethiolsulphonate separated from the reaction mixture. The reaction mixture was stirred for two hours, then filtered and the precipitation was washed with water. The yield was 154 grs. (92% calculated on p-carboxybenzenesulphonchloride). The substance melted with decomposition between 190 and 192° C.

EXAMPLE 2 m-Carboxybenzenesuulfinic acid

Reaction:

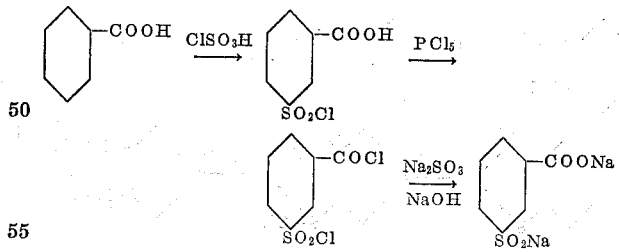

30.5 grs. of benzoic acid (0.25 mol.) was added with stirring to 145.6 grs. of chlorosulphonic acid (1.25 mol.), after which the reaction mixture was heated. At about 100° C., a slightly exothermic reaction started. The temperature increased to about 135° C. Heating was continued at 125° C. for one hour. The reaction mixture was poured out on ice. The crude m-carboxybenzene-sulphochloride which separated was filtered, washed and dried; it was recrystallized one time from benzene. The recrystallized substance melted at 130 to 133° C. 22 grs. (0.1 mol.) of this m-carboxybenzene-sulphochloride, which was not yet pure, was thoroughly mixed with 21 grs. of phosphorus pentachloride. After having heated the reaction mixture for about half an hour at a temperature of 110° C., the phosphorus oxychloride formed was distilled off in vacuo, after which 24 grs. of a brown oil was left, consisting of impure m-carboxychloridebenzenesulphochloride. 23 grs. of this oil was added dropwise with stirring and heating to a solution of 46–4 grs. of sodium sulphite ($Na_2SO_3.7H_2O$; 0.184 mol.) in 45 ccs. of water at a temperature of 50° C. to 70° C. In order to keep the reaction mixture weakly alkaline, a 50% aqueous solution of sodium hydroxide was at the same time added dropwise (total weight of the solution 32 grs.). After all reagent components had been added, the solution was stirred for about half an hour. While cooling, 25 grs. of concentrated sulphuric acid was added carefully, after which the m-carboxybenzene-sulphinic acid separated in a finely divided state. The m-carboxybenzene-sulphinic acid was isolated by extracting the reaction mixture a few times with ethyl-ether. From the etheric extracts 15 grs. of m-carboxybenzene-sulphinic acid with a melting point of 175° C. to 178° C. (decomposition) and with an equivalent weight of 95.5 (calculated weight 95.1) was obtained. The acid was converted into the disodium salt. The output of m-carboxybenzene-sulphochloride was about 70%.

*Trichloromethyl-m-carboxybenzene-thiolsulphonate*

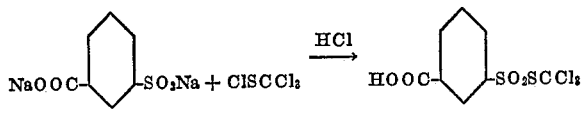

27 grs. (0.117 mol.) of m-carboxybenzenesulphinic acid (disodium salt) and 3 grs. of sodium bicarbonate were dissolved in 250 ccs. of water; then 24.3 grs. (0.131 mol.) of perchloromethylmercaptane was added to the solution and the reaction mixture was shaken vigorously. The solution obtained was twice extracted with ether and then acidified by means of 200 ccs. of 2-N sulphuric acid. The reaction product was isolated by extraction with di-ethyl ether. From the etheric solution, subsequent to drying and evaporation in vacuo, 36.5 grs. of trichloromethyl-m-carboxybenzene-thiolsulphonate with a melting point between 167° and 171° was obtained (yield about 93%).

EXAMPLE 3

*o-Carboxybenzene-sulphinic acid*

Reaction:

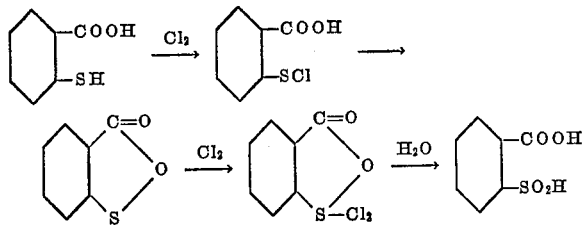

10 grs. of thiosalicylic acid (0.065 mol.) was added to 40 ccs. of anhydrous carbon tetrachloride, after which, chlorine was introduced with stirring until the whole quantity of thiosalicylic acid was dissolved, whilst heat and hydrochloric acid were evolved. By introducing nitrogen the excess of chlorine was expelled. Then 50 ccs. of carbon tetrachloride was added to the reaction mixture in order to redissolve crystallized substance. Subsequent to filtering, the reaction solution was poured out on ice, the o-carboxybenzene-sulphinic acid being thus precipitated. The substance was filtered off and dried in vacuo. The yield was 7.5 grs. (70%); equivalent weight 98.1 (calculated 93.1).

*Trichlormethyl-o-carboxybenzene-thiolsulphonate*

Reaction:

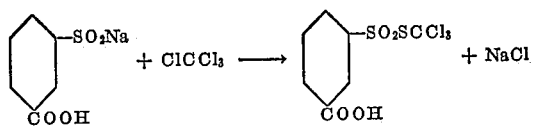

To an aqueous solution of 15 grs. of o-carboxybenzenesulphinic acid (0.081 mol.) were added successively 2 N aqueous sodium hydroxide solution and 1 equivalent of 2-N hydrochloric acid. To the filtered solution (total volume 300 ccs.) was added 15.3 grs. (0.082 mol.) of perchloromethyl-mercaptane and the mixture was shaken vigorously for some time. The precipitated trichloromethyl-o-carboxybenzene-thiolsulphonate had a weight of 24.5 grs. (yield 90%) subsequent to filtering and drying, and melted between 161° C. and 168° C. Subsequent to recrystallisation from benzene fair, scale-shaped crystals having melting points between 164° C. and 172° C. were obtained. The fungitoxicity of the compound obtained was determined by means of a slide germination test. This was carried out as follows:

A series of solutions of the compound to be tested dissolved in acetone, each solution having a concentration differing from the other, were prepared. From each of the solutions 10 μl. were brought on a microscope slide provided with paraffin wax ring having a diameter of 10 mm. After the acetone had been evaporated a droplet having a volume of 50 μl. of a suspension of the spores in water was brought within the wax ring. The suspension contained 10,000 spores per ml. As a stimulant for the germination, to the spore suspension had been added small amounts of a cherry extract, then the microscopic slides were kept at the temperature of 24° C. during 18 hours. After that the results were tabulated (see table).

| Concentration of the trichlormethyl-paracarboxybenzenethiolsulfonate in parts per million. | Rhizopus nigricans | | Pythium debaryanum | | Glomerella cingulata | | Botrytis allii | | Penicillium italicum | | Sclerotinia fructicola | | Alternaria tenuis | | Cladosporium cucumerinum | | Mycosphaerella cannabis | | Fusarium culmorum | | Total |
|---|---|---|---|---|---|---|---|---|---|---|---|---|---|---|---|---|---|---|---|---|---|
| 0.13 | 3 | 3 | 3 | 3 | 3 | 3 | 3 | 3 | 3 | 3 | 3 | 3 | 3 | 3 | 3 | 3 | 3 | 3 | 3 | 3 | 60 |
| 0.25 | 3 | 3 | 3 | 3 | 1 | 3 | 3 | 3 | 3 | 3 | 2 | 3 | 3 | 3 | 3 | 3 | 2 | 3 | 2 | 3 | 56 |
| 0.5 | 3 | 3 | 3 | 3 | 0 | 1 | 3 | 2 | 2 | 2 | 2 | 2 | 3 | 2 | 2 | 0 | 0 | 0 | 0 | 0 | 43 |
| 1.0 | 3 | 3 | 3 | 3 | 0 | 0 | 1 | 2 | 1 | 2 | 0 | 2 | 2 | 2 | 0 | 0 | 0 | 0 | 0 | 0 | 26 |
| 2.0 | 2 | 2 | 1 | 3 | 0 | 0 | 0 | 2 | 0 | 0 | 0 | 0 | 1 | 2 | 0 | 0 | 0 | 0 | 0 | 0 | 13 |
| 4.0 | 1 | 2 | 0 | 1 | 0 | 0 | 0 | 0 | 0 | 0 | 0 | 0 | 0 | 0 | 0 | 0 | 0 | 0 | 0 | 0 | 4 |
| 8.0 | 0 | 0 | 0 | 0 | 0 | 0 | 0 | 0 | 0 | 0 | 0 | 0 | 0 | 0 | 0 | 0 | 0 | 0 | 0 | 0 | 0 |

Explanation of the figures: 0=no germination; 1=only a few spores exhibit a beginning of germination or the spores are swollen; 2=germination delayed with respect to the check; 3=germination is equal to the check.

In the above given table the results are given which were obtained with 10 different fungi. The two figures in each column headed by a separate space show that the tests were conducted for each concentration of the fungicide for each species of space. The concentration mentioned in the first column is the concentration of the active compound present in the 50 μl. spore suspension brought to the microscopic slide. The last column of the table gives the sum of 20 evaluating numbers given to each single experiment; the total amount can not be higher than 60 and will be at least 0 as will be clear from the "explanation of the figures" given just below the table. By careful means the concentration can be calculated which would correspond to a concentration that would give in the last column of the table an addition number of 30. By definition this concentration is called the overall LD 50 value with respect to the tested fungi. The overall LD 50 value indicates the level of fungitoxicity. In this special case the overall LD 50 had been calculated to be 0.093±0.1 parts per million. As to the sensitivity of the different kinds of fungi, a decrease in the order mentioned below could be established.

These fungi may be arranged in four groups, the maximum sensitivity of the fungi associated in one group being about the same. From group I to group IV the maximum sensitivity dropped for each group.

With group I are associated the fungi:

*Glomerella cingulata;*
*Mycosphaerella cannabis;*
*Fusarium culmorum.*

With group II are associated the fungi:

*Sclerotinia fructicola;*
*Cladosporium cucumerinum;*
*Penicillium italicum.*

With group III are associated the fungi:

*Botrytis allii;*
*Alternaria tenuis.*

With group IV are associated the fungi:

*Pythium debaryanum;*
*Rhizopus nigricans.*

For determining the phytotoxicity a 10% solution of the substance in acetone was sprayed over several kinds of higher plants to a quantity of 10 ccs. per 1000 cms.² of ground surface. After the plants had been kept under a luminescence illumination of 3000 Lux at a relative humidity of 85% and a temperature of 22° C. for five days, the degree of leaf burning was determined for broad beans, Nosturtium (*Tropocolum majus*) potatoes, beans, peas, cucumbers, tradescantia (two species), tobacco, begonias (two species), coleus and capsicum. With none of the said species could any leaf injury be observed.

The compounds of the said general formula may be formulated to obtain fungicidal preparations in various ways. Potential methods are:

(*a*) Miscible oils with 15% to 20% of active ingredients, 8% of an non-ionic emulsifying agent (an alkylphenolpolyether-alcohol, such as Triton X–100) and 77% to 72% of a mixture of solvents, mainly consisting of cyclohexanone and xylene, or dioxane and xylene.

(*b*) Aerosols with solvents such as methylethylketone, cyclohexanone, and as propellents methylchloride or various Freons or mixtures thereof.

(*c*) Wettable powders, containing 50 to 80% of active ingredients, furthermore wetting agents such as fatty alcoholsulfates (for example sodiumcetylsulphate) or alkylarylsulfonates (for example Santomerse D or Ultrawet E), dispersing agents (for example Marasperse CB) and carriers such as kaolin, fuller's earth, dolomite etc. Anti caking substances such as colloidal silicic acid may be advantageously added in order to prevent caking under tropical conditions.

(*d*) Dusting powders, containing for example 5% of active ingredients, mixed with carriers of either low or high bulk density, such as kieselguhr or dolomite.

(*e*) Seed protecting preparations, containing for example 50% of the active ingredient, combined with carriers such as kaolin and an adhesive such as paraffin oil.

(*f*) So called coated dusts, prepared by impregnation of a suitable carrier, such as kieselguhr with a solution of the active ingredient in a solvent such as acetone, evaporation of the solvent and milling the product after drying.

What is claimed is:

1. A compound corresponding to the general formula

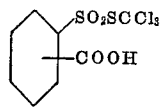

2. A compound corresponding to the formula

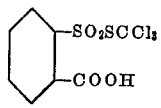

3. A compound corresponding to the formula

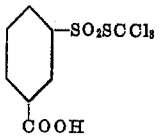

4. A compound corresponding to the formula

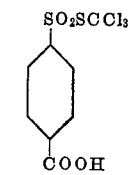

5. A fungicidal nonphytotoxic preparation comprising a fungicidally effective amount of a compound corresponding to the general formula

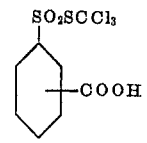

and an inert carrier therefor.

6. The preparation of claim 5 in which the carrier is a liquid carrier.

7. The preparation of claim 5 in which the carrier is a solid carrier.

8. A method of destroying plant fungi comprising contacting plant surfaces with the fungicidal preparation of claim 5.

9. A fungicidal nonphytotoxic preparation comprising a fungicidally effective amount of a compound corresponding to the formula:

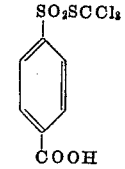

and an inert carrier therefor.

10. A method of destroying plant fungae comprising contacting plant surfaces with the fungicidal preparation of claim 9.

References Cited in the file of this patent

UNITED STATES PATENTS 1,734,682  Lommel et al. ---------- Nov. 5, 1929

OTHER REFERENCES

Backer et al.: Rec. Trav. Chim. 71, pp. 1082–1085 (1952).

Chien-pen Lo et al.: J. A. C. S., vol. 76, No. 6, March 20, 1954, pp. 1704–05.